Feb. 23, 1960  P. BUKOFF  2,926,053
CYLINDER LINER

Filed March 8, 1957  3 Sheets-Sheet 2

INVENTOR.
PETER BUKOFF
BY
John A. Young
ATTORNEY

Feb. 23, 1960 P. BUKOFF 2,926,053
CYLINDER LINER
Filed March 8, 1957 3 Sheets-Sheet 3

INVENTOR.
PETER BUKOFF
BY John A. Young
ATTORNEY

United States Patent Office 2,926,053
Patented Feb. 23, 1960

2,926,053

CYLINDER LINER

Peter Bukoff, South Bend, Ind., assignor to Bendix Aviation Corporation, South Bend, Ind., a corporation of Delaware Application March 8, 1957, Serial No. 644,862

3 Claims. (Cl. 309—3)

This invention relates to a metallic liner for the cylinder bore of a fluid motor, said liner serving as the bearing surface for a reciprocable piston which is a part of the motor.

The invention is particularly useful in the aircraft wheel and brake art, although it is not necessarily restricted to this field. In the aircraft art there is an important design consideration involving weight, which dictates the usage of certain lightweight metals, such as magnesium. Since the housing or carrier of an aircraft wheel and brake is usually a large component of the brake assembly, it is quite advantageous from a weight standpoint to construct this member of magnesium or other lightweight material. Unfortunately, the lightweight materials are often relatively soft and are therefore susceptible to scoring or grooving by the piston which is mounted in cylinder bores formed in the carrier.

It is an object of the present invention to provide a liner for the cylinder bores of lightweight carriers, such as magnesium, in order to safeguard the walls of the cylinder bores which would otherwise be damaged by reciprocable movement of the piston.

In servicing a fluid motor of the brake, it is more advantageous to replace a cylinder bore liner if it should become damaged, than to rebore the cylinder to rectify surface damage, and then replace the original piston with a larger diameter piston.

Other objects and features of the invention will become apparent from a consideration of the following description which proceeds with reference to the accompanying drawings, wherein.

Figure 1:
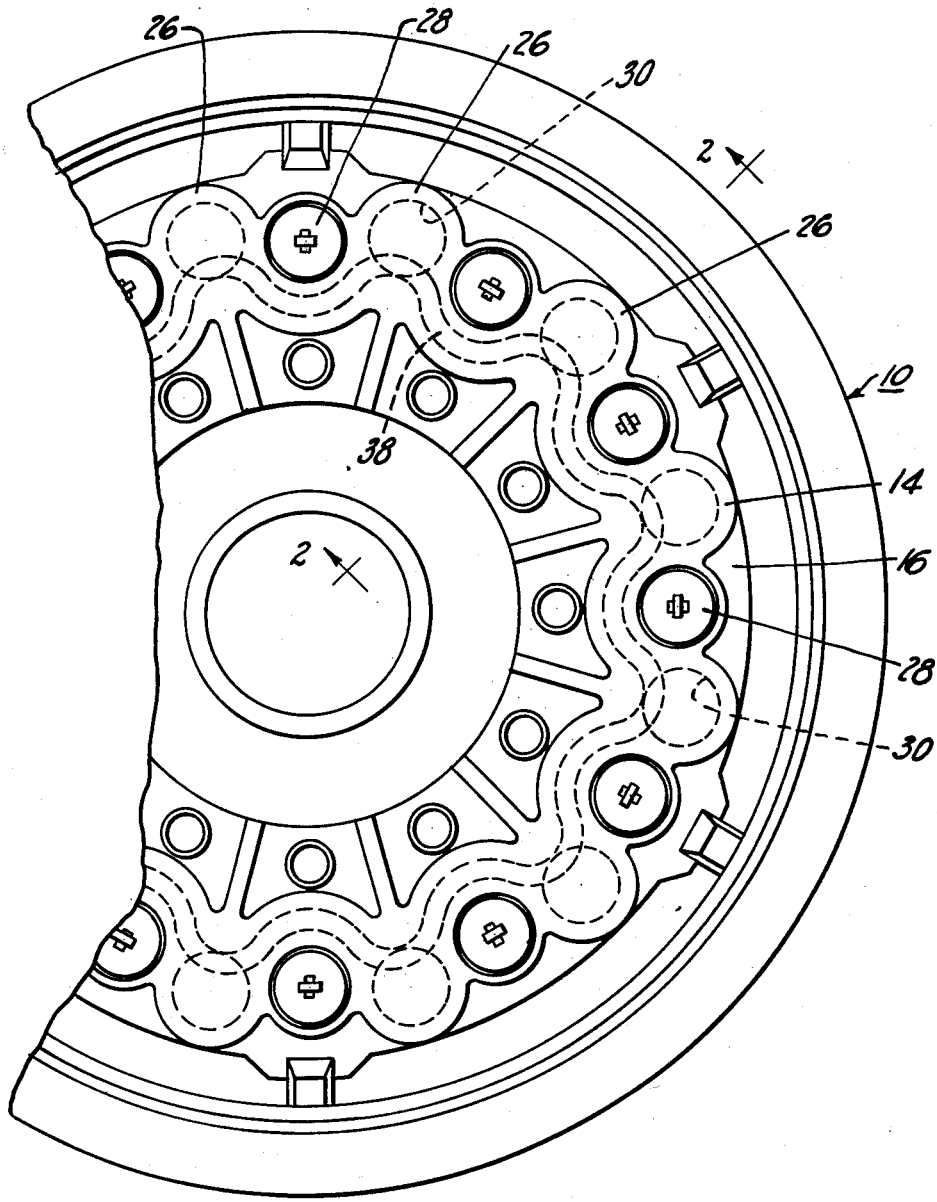
Figure 1 is a side elevation view of a brake incorporating the present invention.

There is provided in combination with aircraft wheel 10, a disc brake designated generally by reference numeral 12. The disc brake comprises a housing 14, a plurality of interleaved rotors 16, and stators 18 which are keyed to the wheel 10, and the axially extending stator keys 20, respectively. At one side of the brake is a pressure plate 22 and at the opposite side of the brake is a fixed reaction plate 24. The carrier 14 consists of a magnesium casting or forging with a number of circumferentially spaced fluid motor actuators 26 provided therein. Return springs 28 are also spaced circumferentially around the carrier and are fastened to the pressure plate 22 to maintain the brake in a normally released position.

Each fluid motor actuator comprises a cylinder bore 30 having a stepped diameter portion 32 at the open end thereof, and a tapered groove 34 at the base of the cylinder bore. An inlet port 36 is also provided at the base of the fluid motor and each of the inlet ports of the respective motors is interconnected by means of a continuous conduit 38 which is formed within the carrier 14. An O ring seal groove 39 is formed in the cylinder bore 30 to receive an O ring seal 40 which prevents leakage of hydraulic fluid.

A liner 42 which consists of a relatively thin walled sleeve has a shoulder 44 formed at the one end that is fitted against the stepped diameter portion 32 of the cylinder bore 30. The liner 42 may consist of case-hardened aluminum.

End 46 (Figure 3) of the liner is notched at 48 (Figure 6) and is tapered in the region indicated by the reference numeral 50. The liner is locked in place by flaring the end 46 outwardly to bring it into tight engagement with the tapered groove 34 at the base of the cylinder bore.

In one method for accomplishing this tapering, a core 51 having a circular boss 52 is inserted in the cylinder bore. A resilient, deformable ring 54, which may consist of rubber or the like, is then fitted over the core 51 and brought against the boss 52. It should be noted that the edge 56 (Figure 4) is rounded to minimize extrusion of the ring into the inlet port 36 when it is deformed under pressure.

A hollow cylinder 58 is next passed over core 51, the wall of the cylinder 58 being of such dimension that there is a close fit between the liner 42 and core 51.

Figures 3, 4:
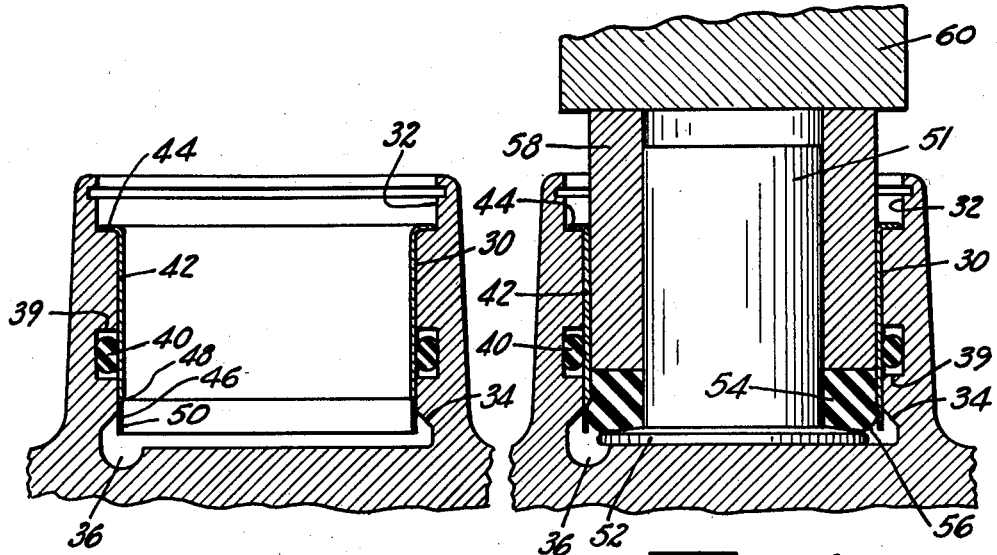
Figure 3 shows the liner when it is first fitted in the cylinder bore.
Figure 4 shows the equipment used for locking the tapered end of the liner within the cylinder bore.
Figure 5:
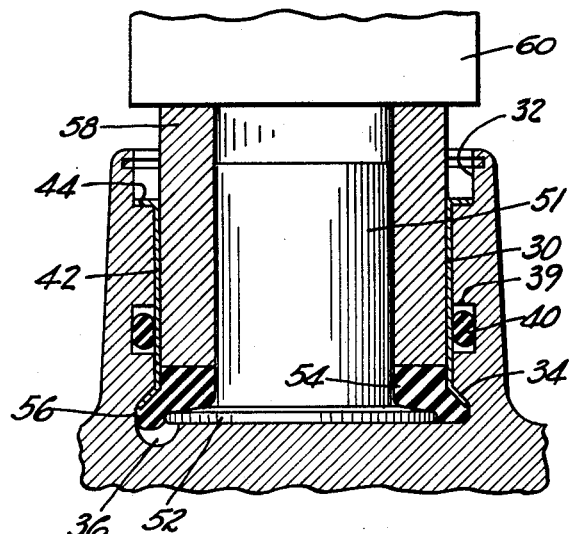
Figure 5 illustrates the condition of the equipment while the end of the liner is being deformed.

A pressure head 60 is then brought to bear against the end of cylinder 58, and, while the housing 14 is held fast, the pressure head 60 is moved toward the housing to deform the rubber ring from the shape indicated in Figure 4 to the shape indicated in Figure 5. The lower part of the ring 54 tends to swell out and fill the tapered groove 34 and, in doing so, it crimps the tapered end 46 of the sleeve so that it is brought into tight engagement with the groove 34.

The ring 54 is prevented from extruding into the port 36 since the boss 52 partially covers the port 36, and also because of the rounding on edge 56.

When the pressure head 60 is raised, the resilient ring 54 returns to its original shape, the cylinder 58 is removed, and the core 51 is withdrawn from the cylinder bore. The ring 54 is removed along with the core 51, since the two are held together by means of boss 52.

Figure 2:
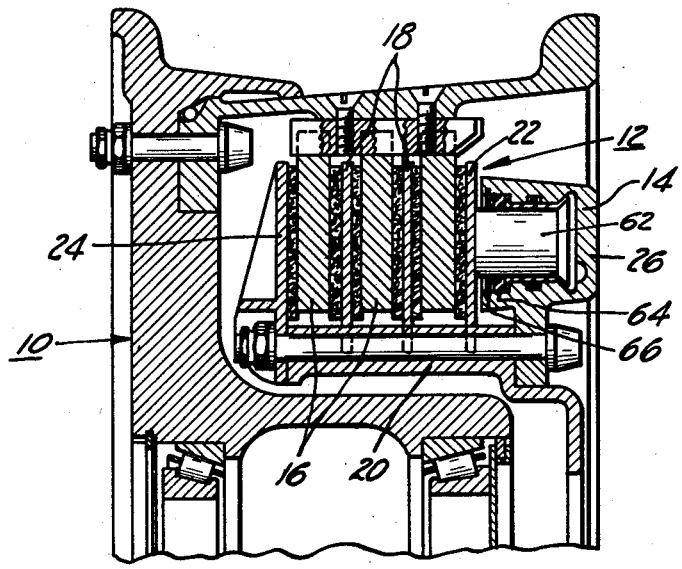
Figure 2 is a section view taken on the line 2—2 of Figure 1.

A Teflon coated piston 62 (Figure 2) is then reciprocably received in the cylinder bore, the bearing for the piston being the inner surface of liner 42.

A wiper 64 is provided at the open end of the cylinder and is held in place by means of a snap ring 66. The purpose of the wiper is to block the entrance of dirt and other foreign matter into the sliding surface area between the piston and the liner. It has been found that most of the damage done to the sliding surfaces between the liner 42 and the piston 62 is caused by grating of foreign material between the piston 62 and the bearing surface of the liner.

The reason for using a deformable ring shape for member 54 instead of a solid disc is that the orders of pressure necessary to deform the tapered end 46 of the liner 42 are necessarily high, and if it became necessary to exert this order of pressure on a solid face member instead of a ring shaped member, there would be an extremely high total force exerted on the base of the carrier, which could fracture or deform the carrier 14. The force can be reduced by reducing the area of the deformable member from a solid disc shape to the annular or ring shape which is illustrated.

Figure 6:
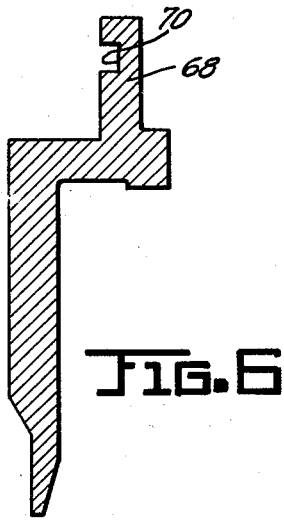
Figure 6 is an enlarged view of a second embodiment of the liner having the upper portion thereof somewhat revised, but the lower part being the same as that of the previous embodiment; and, Figure 7 is a mechanical device for crimping the tapered end of the liner.

Instead of fitting the snap ring 66 into a groove in the stepped portion 32 of the cylinder bore, it is also possible to form an extension 68 of the liner, as indicated in Figure 6, and form a groove 70 therein for locking the wiper 64 in place.

Figure 7:
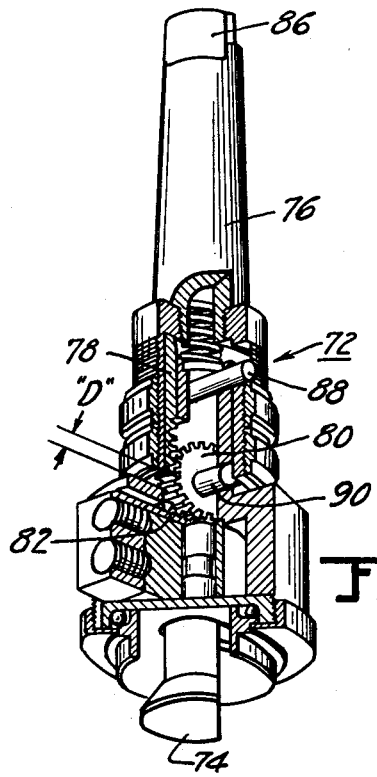

Another means for flaring the tapered end 46 of the liner is by usage of the tool shown in Figure 7. The tool 72 is a Maxwell recessing tool which is adapted for this purpose by substituting a forming member instead of a cutting member at the end 74 of the tool. The specific construction details of the tool 72 form no part of the present invention. The tool is manufactured by the Maxwell Company and is commonly used for grooving, recessing and back-facing.

In operation, the shank 76 of the tool is moved through the distance "D" thus causing rack 78 to move longitudinally relative to meshing gear 80 which is thereby rotated to move rack 82 in a radial direction and thus makes it eccentric in relationship to the longitudinal axis of the tool.

Once the forming member 74 is displaced radially to be in eccentric relationship, the tool is rotated about its longitudinal axis so that the forming member 74 will crimp the tapered end 46 of the liner against the shoulder 34 at the base of the fluid motor. Rotation of the shank 76 is produced by exerting a turning effort at end 86, and this torque is transmitted ultimately to the forming member through pins 88 and 90.

Once the liner 42 has become worn, it can be removed by means of a cutting tool which separates the crimped end 46 of the liner from the cylindrical portion thereof. The liner can then be removed and the residual portion of the liner is next withdrawn.

A replacement liner is then installed in place of the worn liner. This simple expedient of liner replacement is an improvement over the previous technique of servicing the cylinder, which was to machine the entire cylinder bore sufficiently to remove any galled or scored portions thereof, and then refitting the cylinder bore with a larger diameter piston. By means of the present invention, the liner, which is a relatively inexpensive item, can be locked in place within the cylinder bore by either of the disclosed processes at a slight cost. The same piston is re-usable with the replaced liner.

Although the invention has been described with but two selected embodiments of the invention, it will be apparent to those skilled in the art that these examples are merely illustrations of the principles of the invention. It is intended, therefore, to include within the scope of the following claims such revisions and modifications of the invention as are reasonably expected from those skilled in the art and which do not depart from the herein disclosed principles.

I claim:

1. A fluid motor construction comprising a cylinder bore having a stepped diameter portion at the open end thereof, a tapered groove formed adjacent the base or closed end of the cylinder bore, an O ring groove formed intermediate the stepped diameter portion and said tapered groove, an O ring seal which is fitted in the O ring groove, a liner receivable in said cylinder bore, said liner being a relatively thin walled sleeve with a retaining shoulder engageable with the stepped end of the cylinder bore, a tapered end on said sleeve which is located at the closed end or base of said cylinder bore and is deformable into locking engagement with the tapered groove in said cylinder bore, and a notched portion of said sleeve adjacent the tapered end which prevents scoring of the piston by bulging of the liner resulting from deformation of the tapered end of said liner.

2. A fluid motor construction comprising a cylinder bore having a stepped diameter portion at the open end thereof, a tapered groove formed adjacent the base or closed end of the cylinder bore, an O ring groove formed intermediate the stepped diameter portion and said tapered groove, an O ring seal which is fitted in the O ring groove, a liner receivable in said cylinder bore, said liner being a relatively thin walled sleeve with a retaining shoulder engageable with the stepped end of the cylinder bore, a tapered end on said sleeve which is located at the closed end or base of said cylinder bore and is deformable into locking engagement with the tapered groove in said cylinder bore.

3. A fluid motor construction comprising a cylinder bore having a tapered groove formed adjacent a base or closed end of the cylinder bore, a liner receivable in said cylinder bore, said liner being a relatively thin-walled sleeve with a tapered end portion which is located adjacent the closed end or base of said cylinder bore, said tapered end portion being deformable into locking engagement with the tapered groove in said cylinder bore.

References Cited in the file of this patent

UNITED STATES PATENTS

| | | |
|---|---|---|
| 1,704,228 | Tibbetts | Mar. 5, 1929 |
| 1,944,380 | Vance | Jan. 23, 1934 |
| 2,005,267 | Rehder | June 18, 1935 |
| 2,260,440 | Cunningham et al. | Oct. 28, 1941 |
| 2,387,971 | Aspin et al. | Oct. 30, 1945 |
| 2,447,340 | Jackson | Aug. 17, 1948 |
| 2,617,401 | Rippingille | Nov. 11, 1952 |
| 2,635,021 | Alward | Apr. 14, 1953 |
| 2,730,960 | Krause | Jan. 17, 1956 |